US012587730B2

(12) United States Patent
Park

(10) Patent No.: US 12,587,730 B2
(45) Date of Patent: Mar. 24, 2026

(54) CAMERA MODULE

(71) Applicant: LG INNOTEK CO., LTD., Seoul (KR)

(72) Inventor: Kang Yeol Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 196 days.

(21) Appl. No.: 18/260,061

(22) PCT Filed: Feb. 15, 2021

(86) PCT No.: PCT/KR2021/001921
§ 371 (c)(1),
(2) Date: Jun. 30, 2023

(87) PCT Pub. No.: WO2022/154160
PCT Pub. Date: Jul. 21, 2022

(65) Prior Publication Data
US 2024/0056669 A1 Feb. 15, 2024

(30) Foreign Application Priority Data
Jan. 15, 2021 (KR) ........................ 10-2021-0005637

(51) Int. Cl.
*H04N 23/56* (2023.01)
*G03B 30/00* (2021.01)

(52) U.S. Cl.
CPC ............. *H04N 23/56* (2023.01); *G03B 30/00* (2021.01)

(58) Field of Classification Search
CPC .... H04N 23/56; H04N 13/236; H04N 13/254; H04N 23/55; G03B 30/00; G01S 17/10;
(Continued)

(56) References Cited

U.S. PATENT DOCUMENTS

| | | | |
|---|---|---|---|
| 9,674,415 B2 | 6/2017 | Wan et al. | |
| 11,947,041 B2 * | 4/2024 | Policht | G01S 7/4815 |
| 2016/0037094 A1 * | 2/2016 | Chang | H04N 13/271 |
| | | | 356/5.01 |
| 2016/0178991 A1 * | 6/2016 | Wan | H04N 23/61 |
| | | | 362/11 |

(Continued)

FOREIGN PATENT DOCUMENTS

| | | |
|---|---|---|
| CN | 110249177 A | 9/2019 |
| CN | 111142088 A | 5/2020 |

(Continued)

OTHER PUBLICATIONS

International Search Report dated Sep. 14, 2021 in International Application No. PCT/KR2021/001921.

(Continued)

*Primary Examiner* — Timothy J Henn
(74) *Attorney, Agent, or Firm* — Saliwanchik, Lloyd & Eisenschenk

(57) ABSTRACT

A camera module according to an embodiment of the present invention includes a light emitting unit which emits light with a spot light pattern or flood light pattern to an object, and a light receiving unit which receives light reflected by the object, wherein the light emitting unit includes a light source including a plurality of emitters disposed at a predetermined pitch, a lens assembly disposed to be spaced apart from an upper end of the light source, and a driving module which changes a distance between the light source and the lens assembly by moving the lens assembly by a predetermined movement distance from a reference distance in an optical axis direction.

10 Claims, 13 Drawing Sheets

(58) Field of Classification Search
CPC ...... G01S 17/36; G01S 7/4816; G01S 17/894;
G01S 7/4815
See application file for complete search history.

(56)                     References Cited

U.S. PATENT DOCUMENTS

| | | | | |
|---|---|---|---|---|
| 2017/0289524 | A1* | 10/2017 | Pacala ................... | G01S 7/4815 |
| 2020/0003870 | A1* | 1/2020 | Chen .................... | G01S 7/4816 |
| 2021/0181316 | A1* | 6/2021 | Zhu ........................ | G01S 17/894 |
| 2022/0103741 | A1* | 3/2022 | Lee ...................... | G06V 10/145 |
| 2022/0268571 | A1* | 8/2022 | Tsai ....................... | G01B 11/22 |
| 2023/0184952 | A1* | 6/2023 | Kang ................... | G01S 7/4865 |
| | | | | 356/5.01 |
| 2023/0288193 | A1* | 9/2023 | Hamid Muhammed | .................... |
| | | | | G03B 17/54 |

FOREIGN PATENT DOCUMENTS

| | | | |
|---|---|---|---|
| CN | 111164732 | A | 5/2020 |
| KR | 10-2012-0069833 | A | 6/2012 |
| KR | 10-2015-0109187 | A | 10/2015 |
| KR | 10-2019-0079596 | A | 7/2019 |
| KR | 10-2019-0129440 | A | 11/2019 |
| WO | 2018/118955 | A1 | 6/2018 |

OTHER PUBLICATIONS

Supplementary European Search Report dated Jun. 10, 2024 in
European Application No. 21919789.4.
Office Action dated Mar. 7, 2025 in Taiwanese Application No.
11420252860.

* cited by examiner $D_{ref}$

WDS $D_{ref}$

WDS

FIG. 8

CAMERA MODULE

CROSS-REFERENCE TO RELATED APPLICATIONS

This application is the U.S. national stage application of International Patent Application No. PCT/KR2021/001921, filed Feb. 15, 2021, which claims the benefit under 35 U.S.C. § 119 of Korean Application No. 10-2021-0005637, filed Jan. 15, 2021, the disclosures of each of which are incorporated herein by reference in their entirety.

BACKGROUND

1. Field of the Invention

The present invention relates to a camera module.

2. Discussion of Related Art

Three-dimensional content is applied to various fields such as education, manufacturing, automatic driving, and the like in addition to the fields of game and culture. In order to obtain the three-dimensional content, a depth map is required. The depth map is a map showing a spatial distance and shows perspective information of one point with respect to another point in a two-dimensional image. A method of projecting infrared (IR) structured light to an object, a method of using a stereo camera, a time of flight (ToF) method, or the like is used as a method of obtaining the depth map.

In the case of the ToF method or the structured light method, light in an infrared wavelength range is used, and recently, there has been an attempt to use a feature of the infrared wavelength range for biometric identification. For example, it is known that a shape of veins spread in a finger or the like does not change during a person's lifetime from a time when the person is a fetus. Accordingly, a vein pattern may be recognized using a camera device in which an IR light source is installed. To this end, after an image of fingers is captured, a background is removed from the image on the basis of a color and a shape of the fingers to detect the fingers, and a vein pattern of the fingers may be extracted from color information of the detected fingers. That is, an average color of the fingers, a color of veins spread in the fingers, and a color of wrinkles on the fingers may be different from each other. For example, a red color of the veins spread in the fingers may be paler than an average color of the fingers, and a color of the wrinkles on the fingers may be darker than the average color of the fingers. An approximate value for the veins for each pixel may be calculated using these features, and a vein pattern may be extracted using a calculated result. In addition, individuals may be identified by comparing the extracted vein pattern of the fingers and preregistered data. In addition, in order to measure size information or distance information of an object at a long distance, a depth map is sometimes obtained through a camera in the ToF method or the structured light method ToF.

As described above, a camera configured to obtain a depth map through the ToF method and the like is used in various application fields, and the number of application fields is increasing continuously.

However, in the case of the conventional ToF camera, since the conventional ToF camera is developed in a structure specified to a certain application field, there is a problem in that one ToF camera is not sufficient in various fields. For example, a flood light pattern is used in an application field in which a high resolution depth map is required, and a spot light pattern is used in a field in which a depth map at a long distance is required, but the conventional ToF camera has a structure which should provide only one light pattern. Accordingly, a ToF camera capable of being used in various fields is required.

SUMMARY OF THE INVENTION

The present invention is directed to providing a time of flight (ToF) camera module which is adaptively driven according to an objective of image capturing to emit various light patterns to an object.

Objectives to be solved by the present invention are not limited to the above-described objectives and include purposes or effects which may be understood from solutions or embodiments described below.

According to an aspect of the present invention, there is provided a camera module including a light emitting unit which emits light with a spot light pattern or flood light pattern to an object, and a light receiving unit which receives light reflected by the object, wherein the light emitting unit includes a light source including a plurality of emitters disposed at a predetermined pitch, a lens assembly disposed to be spaced apart from an upper end of the light source, and a driving module which changes a distance between the light source and the lens assembly by moving the lens assembly by a predetermined movement distance from a reference distance in an optical axis direction.

The reference distance may be an effective focal length of the lens assembly.

When the movement distance is in a first range, the light emitting unit may emit the light with the flood light pattern to the object.

The first range may be set on the basis of a diameter of each of the plurality of emitters, a pitch between the plurality of emitters, and a divergence angle of each of the plurality of emitters.

The first range (DR) may be set according to Expression below.

$$\frac{2.4 \times P_E - D_E}{2 \times \tan\left(\frac{\theta_D}{2}\right)} < DR < \frac{4.2 \times P_E - D_E}{2 \times \tan\left(\frac{\theta_D}{2}\right)}$$

Here, $P_E$ denotes the pitch between the plurality of emitters, $D_E$ denotes the diameter of each of the plurality of emitters, and $\theta_D$ denotes the divergence angle of each of the plurality of emitters.

The first range (DR) may be set according to Expression below.

$$\frac{3 \times P_E - D_E}{2 \times \tan\left(\frac{\theta_D}{2}\right)} < DR < \frac{4.2 \times P_E - D_E}{2 \times \tan\left(\frac{\theta_D}{2}\right)}$$

Here, $P_E$ denotes the pitch between the plurality of emitters, $D_E$ denotes the diameter of each of the plurality of emitters, and $\theta_D$ denotes the divergence angle of each of the plurality of emitters.

When the movement distance is in a second range, the light emitting unit may emit the light with the spot light pattern to the object.

The second range may be 0 to 25 μm.

The pitch between the plurality of emitters may be in the range of 32.5 to 38.5 μm, the diameter of each of the plurality of emitters may be in the range of 7.2 to 8.8 μm, and the divergence angle of each of the plurality of emitters may be in the range of 15 to 25 degrees.

The pitch between the plurality of emitters may be in the range of 16.3 to 22.3 μm, the diameter of each of the plurality of emitters may be in the range of 3.6 to 4.4 μm, and the divergence angle of each of the plurality of emitters may be in the range of 13 to 23 degrees.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 8 is a view for describing an operation of the light emitting unit when light with a spot light pattern is output.

DETAILED DESCRIPTION OF EXEMPLARY EMBODIMENTS

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used in the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

A camera module according to an embodiment of the present invention may be referred to as a camera or a camera device which obtains a depth map using a time of flight (ToF) function. Accordingly, the camera module may be used interchangeably with a ToF camera device, a ToF camera module, or a ToF camera.

Figure 1:
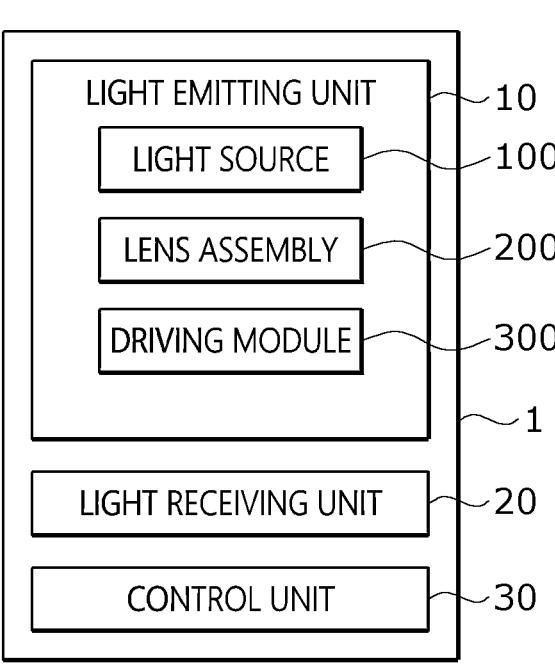
FIG. 1 is a view illustrating an example configuration of a camera module according to an embodiment of the present invention.

FIG. 1 is a view illustrating an example configuration of the camera module according to the embodiment of the present invention.

As illustrated in FIG. 1, the camera module according to the embodiment of the present invention may include a light emitting unit 10 and a light receiving unit 20 and may further include a control unit 30.

The light emitting unit 10 may be a unit which generates light and outputs the generated light to an object. The light may be an optical signal. To this end, the light emitting unit 10 may include a component, such as a light-emitting element, capable of generating light and a component capable of modulating the light. The light may be an optical signal modulated in the form of a pulse wave or a continuous wave. The continuous wave may be a sinusoid wave or squared wave.

The light emitting unit 10 may output light with various patterns. As an example, the light emitting unit 10 may output light with a flood light pattern. The flood light pattern may be referred to as a surface light pattern or surface light source pattern. As another example, the light emitting unit 10 may output light with a spot light pattern. The spot light pattern may be referred to as a spot light pattern or spot light source pattern. That is, the light emitting unit 10 may emit the light with the flood light pattern to the object or emit the light with the spot light pattern to the object according to a control signal.

To this end, the light emitting unit 10 may include a light source 100, a lens assembly 200, and a driving module 300.

The light source 100 may include a plurality of emitters. The light source 100 may emit light generated by the plurality of emitters. The plurality of emitters may be arrayed according to a predetermined rule. The light source 100 may be a vertical-cavity surface-emitting laser (VCSEL) array.

The lens assembly 200 may collect light output from the light source 100. The lens assembly 200 may output the collected light. The lens assembly 200 may be disposed to be spaced apart from an upper end of the light source 100. In this case, the upper end of the light source 100 may be a side to which the light is output from the light source 100. The lens assembly 200 may include at least one lens.

The lens assembly 200 may include the at least one lens and a housing. The housing may be a frame capable of accommodating the at least one lens. According to one embodiment, the housing may be coupled to the driving module 300, and the lens assembly 200 may be moved in an optical axis direction by the driving module 300.

The lens assembly 200 may have a predetermined effective focal length (EFL). When the lens assembly 200 includes one lens, an EFL of the lens assembly 200 may be an EFL of the one lens. When the lens assembly 200 may include a plurality of lenses, an EFL of the lens assembly 200 may be a combined EFL of the plurality of lenses. In the present invention, the EFL of the lens assembly 200 may be referred to as a reference distance.

The driving module 300 may move a lens module by a predetermined movement distance from the reference distance in the optical axis direction. Accordingly, the driving module 300 may change a distance between the light source 100 and the lens assembly 200 by moving the lens module. According to the embodiment of the present invention, the driving module 300 may be coupled to the lens assembly 200. For example, the driving module 300 may be coupled to the housing included in the lens assembly 200.

According to one embodiment, the driving module 300 may include an actuator. The actuator may be a voice coil motor (VCM), micro-electro mechanical systems (MEMS), or actuator based on piezo electricity or a shape memory alloy (SMA). In addition, the actuator may be one of various units capable of moving the lens assembly 200.

The light receiving unit 20 may detect light reflected by the object. The light receiving unit 20 may detect an optical signal reflected by the object. In this case, the detected light may be light output by the light emitting unit 10 and reflected by the object. The light receiving unit 20 may include a lens module, a filter, and a sensor in order to detect the optical signal.

The light reflected by the object may pass through the lens module. An optical axis of the lens module may be aligned with an optical axis of the sensor. The filter may be disposed between the lens module and the sensor. The filter may be disposed on an optical path between the object and the sensor. The filter may filter light in a predetermined wavelength range. The filter may allow light in a specific wavelength band to pass therethrough. The filter may allow the light with the specific wavelength to pass therethrough. For example, the filter may allow light in a wavelength band of an optical signal output by the light emitting unit 10 to pass therethrough. The filter may allow infrared light to pass therethrough and may block light other than the infrared light. Alternatively, the filter may allow visible light to pass therethrough and block light other than the visible light. The sensor may detect light. The sensor may receive an optical signal. The sensor may be an image sensor which detects an optical signal. The sensor may detect the optical signal and output an electric signal. The sensor may detect light with a wavelength corresponding to a wavelength of light output from the light emitting element. The sensor may detect infrared light. Alternatively, the sensor may detect visible light. The sensor may include a pixel array configured to convert light passing through the lens module to an electric signal corresponding to the light, a driving circuit configured to drive a plurality of pixels included in the pixel array, and a readout circuit configured to read analog pixel signals of the pixels. The readout circuit may compare the analog pixel signals with a reference signal to perform analog-digital conversion so as to generate digital pixel signals (or image signals). In this case, the digital pixel signals of the pixels included in the pixel array constitute the image signals, and since the image signals are transmitted in units of frames, the image signals may be defined as an image frame. That is, the image sensor may output a plurality of image frames.

The light receiving unit 20 may be disposed parallel to the light emitting unit 10. The light receiving unit 20 may be disposed beside the light emitting unit 10. The light receiving unit 20 may be disposed in the same direction as the light emitting unit 10.

The control unit 30 may control at least one of the light emitting unit 10 and the light receiving unit 20 to be driven. As one embodiment, the control unit 30 may generate a control signal and change a light pattern of light output from the light emitting unit 10 using the control signal. As one embodiment, the control unit 30 may be included in the camera module. For example, the control unit 30 may be realized in the form of being coupled to a substrate of the camera module. As another embodiment, the control unit 30 may also be included in a terminal in which the camera module is disposed. For example, the control unit 400 may be realized in the form of an application processor (AP) of a smartphone equipped with the camera module.

Figure 2:
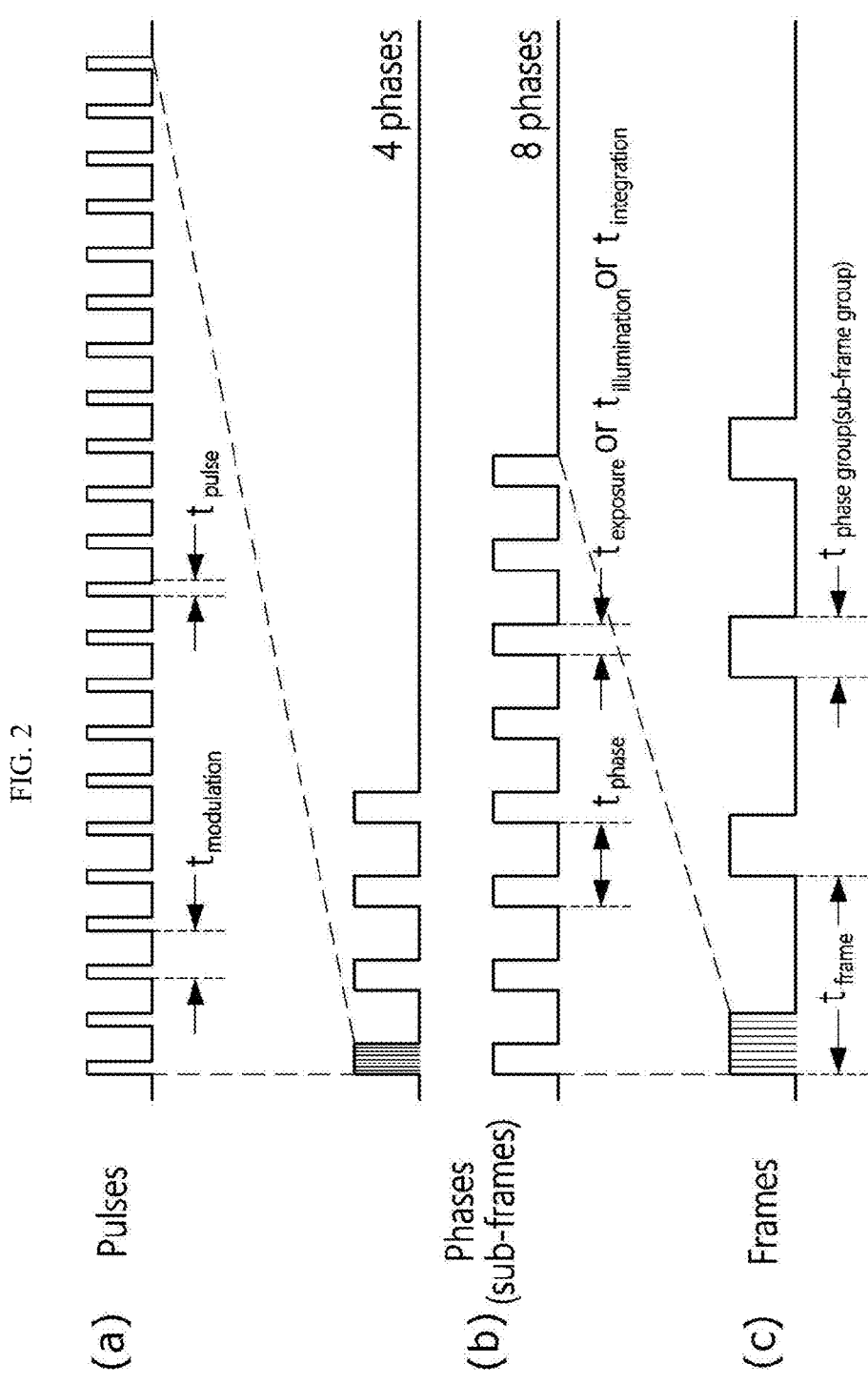
FIG. 2 is a set of views for describing an optical signal generated by a light emitting unit according to an embodiment of the present invention.

FIG. 2 is a set of views for describing an optical signal generated by the light emitting unit according to the embodiment of the present invention.

As illustrated in FIG. 2A, the light emitting unit 10 may generate a light pulse with a constant period. The light emitting unit 10 may generate a light pulse having a predetermined pulse width $t_{pulse}$ with a predetermined pulse repetition period $t_{modulation}$.

As illustrated in FIG. 2B, the light emitting unit 10 may generate one phase pulse by grouping the predetermined number of the light pulses. The light emitting unit 10 may generate a phase pulse having a predetermined phase pulse width $t_{exposure}$, $t_{illummation}$, or $t_{integration}$ with a predetermined phase pulse period $t_{phase}$. In this case, one phase pulse period $t_{phase}$ may correspond to one sub-frame. The sub-frame may be referred to as a phase frame. The predetermined number of the phase pulse periods may be grouped. A method of grouping four phase pulse periods $t_{phase}$ may be referred to as a 4-phase method. A method of grouping eight periods $t_{pphase}$ may be referred to as an 8-phase method.

As illustrated in FIG. 2C, the light emitting unit 10 may generate one frame pulse by grouping the predetermined number of the phase pulses. The light emitting unit 10 may generate a frame pulse having a predetermined frame pulse width $t_{phase\ group\ (sub-frame\ group)}$ with a predetermined frame pulse period $t_{frame}$. In this case, one frame pulse period $t_{frame}$ may correspond to one frame. Accordingly, when an image of the object is captured at 10 frames per second (FPS), the frame pulse period $t_{frame}$ may be repeated 10 times per second. In the 4-phase method, four sub-frames may be included in one frame. That is, one frame may be generated using four sub-frames. In the 8-phase method, eight sub-frames may be included in one frame. That is, one frame may be generated using eight sub-frames.

The terms of the light pulse, the phase pulse, and the frame pulse are used for describing the description, but the present invention is not limited thereto.

Figure 3:
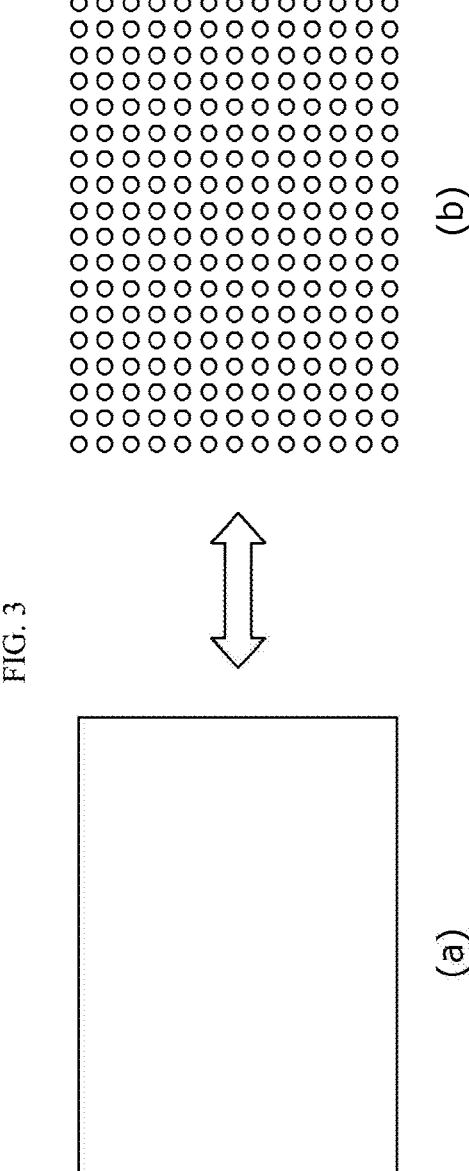
FIG. 3 is a set of views illustrating a light pattern which is changed according to an embodiment of the present invention.

FIG. 3 is a set of views illustrating a light pattern which is changed according to the embodiment of the present invention.

Referring to FIG. 3, the camera module according to the embodiment of the present invention may change a light pattern of light emitted to the object. The light pattern may be divided into a flood light pattern or spot light pattern. According to one embodiment, the camera module according to the embodiment of the present invention may emit light with any one light pattern of the flood light pattern and the spot light pattern by moving the lens assembly 200 using the driving module 300.

The flood light pattern may be a pattern in which light is uniformly spread in a space as in FIG. 3A. In this case, the term "uniformly" may mean that light is continuously spread in the space instead of the same quantity of light being emitted to the space to which the light is emitted. In the case of the flood light pattern, since the light is uniformly and continuously spread in the space, when the light with the flood light pattern is emitted to the object, there is an advantage in that a depth map with a high resolution may be obtained. However, since the light is uniformly spread in the space, a receiving quantity of light is small, and thus, as a distance from the object increases, precision of a depth map may be degraded. In order to improve the precision, an output of the light source 100 may be increased, but there are problems in that power consumption may increase and an eye-safety issue may occur.

However, the spot light pattern may be a pattern in which light is locally collected in a space as in FIG. 3B. That is, the spot light pattern may be a pattern in which light is locally concentrated in a space instead of being continuously spread in the space. In the case of the spot light pattern, since the light is concentrated locally, a quantity of light in each spot is large. Accordingly, there is an advantage in that a depth map with a high precision may be obtained even when a distance from the object is long. However, as the light is concentrated locally, there is a problem in that a resolution of the depth map is lower than that of the flood light pattern.

As described above, in the flood light pattern and the spot light pattern, the advantages and disadvantages may have complementary relationships. Accordingly, in the present invention, the flood light pattern and the spot light pattern may be changed to each other so that the advantages thereof are maximized.

Figure 4:
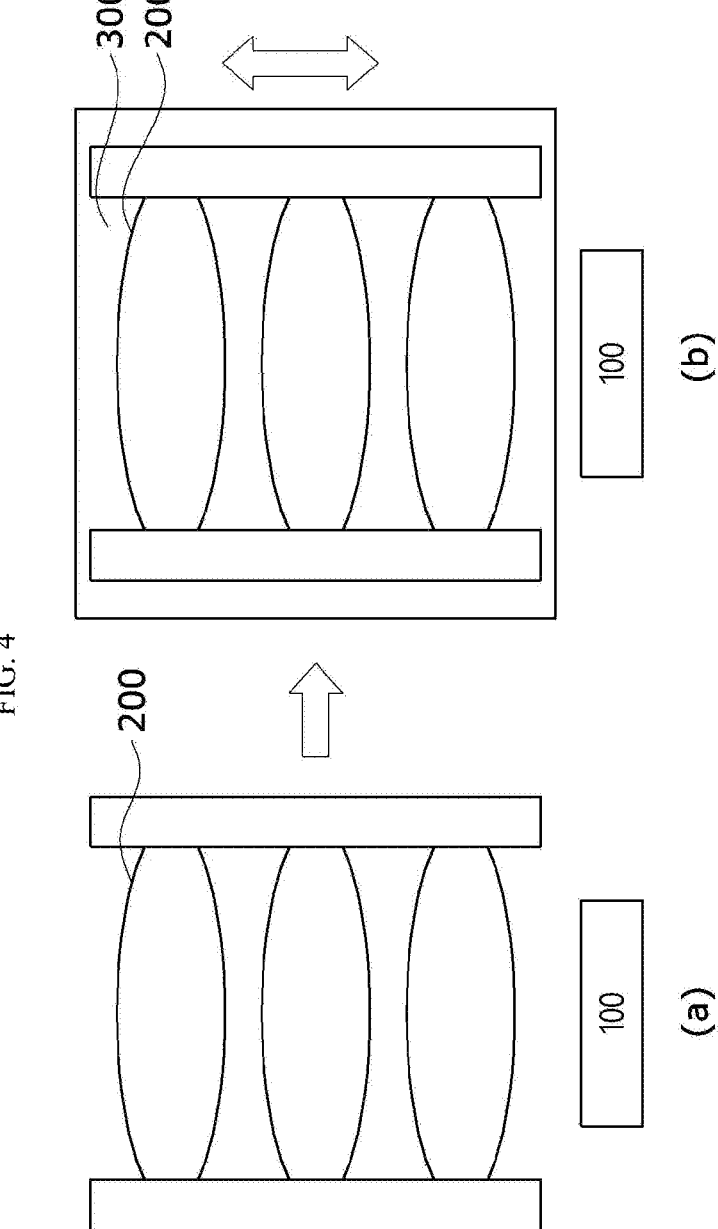
FIG. 4 is a set of views for describing a structure of the light emitting unit according to an embodiment of the present invention.

FIG. 4 is a set of views for describing a structure of the light emitting unit according to the embodiment of the present invention;

FIG. 4A is a schematic view illustrating a structure of a light emitting unit 10 including a light source 100 and a lens assembly 200. As in FIG. 4A, when there is no driving member, the lens assembly 200 and the light source 100 are disposed to be spaced apart from each other by a predetermined distance, and a predetermined distance is not changed. That is, light with one light pattern determined according to a separation distance between the lens assembly 200 and the light source 100 may be output, and the light pattern may not be changed.

Conversely, the light emitting unit 10 according to the embodiment of the present invention further includes the driving module 300. FIG. 4B is a schematic view illustrating a structure of the light emitting unit 10 including the light source 100, the lens assembly 200, and the driving module 300. As in FIG. 4B, when the light emitting unit 10 includes the driving module 300 coupled to the lens assembly 200, the driving module 300 may move the lens assembly 200 in a vertical direction (optical axis direction) to change a separation distance between the light source 100 and the lens assembly 200. As the separation distance between the lens assembly 200 and the light source 100 is changed, a light pattern of light emitted to the object may be changed. According to the embodiment, when a distance between the light source 100 and the lens assembly 200 is the reference distance, light with the spot light pattern may be emitted to the object. However, when the lens assembly 200 is moved by a predetermined distance along the optical axis (that is, the lens assembly 200 is moved toward or away from the light source 100 by the movement distance from the reference distance), light with the flood light pattern may be emitted to the object.

Figures 5A, 5B:
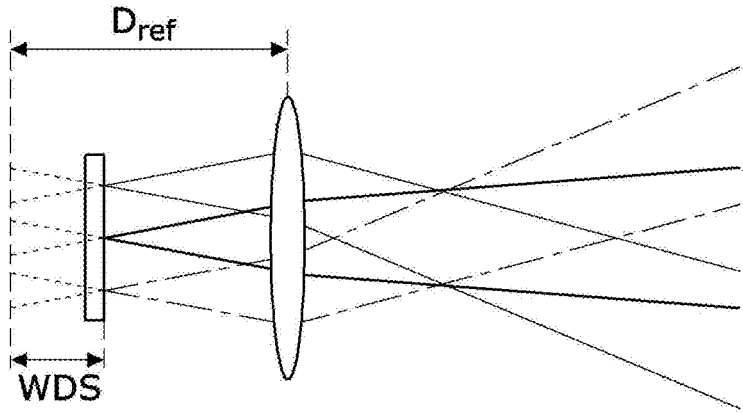
FIGS. 5A and 5B are views for describing an operation of the light emitting unit when light with a flood light pattern is output.
Figure 6A:
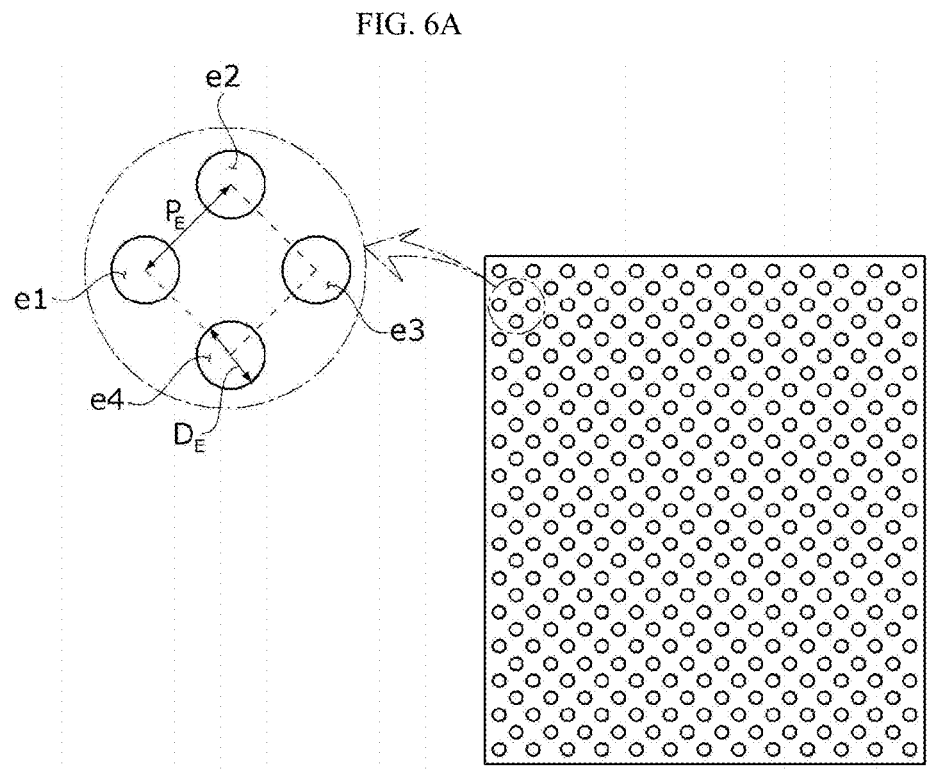
FIGS. 6A and 6B are views illustrating an upper surface of a light source including a plurality of emitters.
Figure 6B:
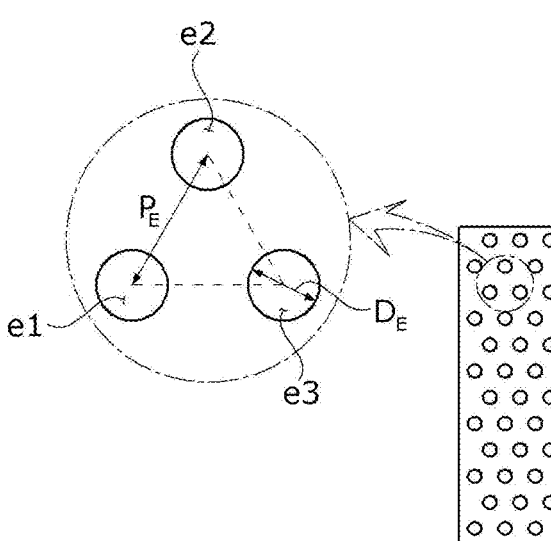
Figure 7:
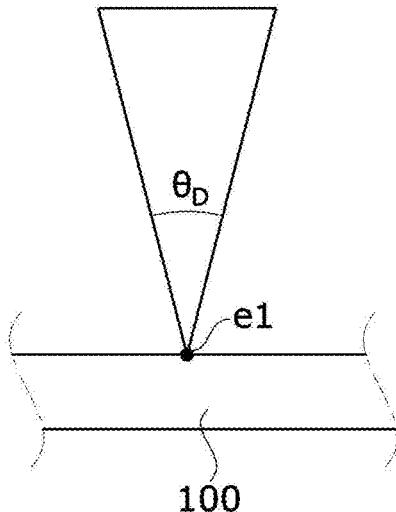
FIG. 7 is a view illustrating a part of a side surface of the light source of the plurality of emitters.

FIGS. 5A and 5B are views for describing an operation of the light emitting unit when light with the flood light pattern is output. FIGS. 6A and 6B are views illustrating an upper surface of the light source including the plurality of emitters, and FIG. 7 is a view illustrating a part of a side surface of the light source of the plurality of emitters.

FIG. 5A is the view showing a case in which the lens assembly 200 is moved so that the distance between the light source 100 and the lens assembly 200 is increased to be greater than the reference distance by a movement distance. FIG. 5B is the view showing a case in which the lens assembly 200 is moved so that the distance between the light source 100 and the lens assembly 200 is decreased to be shorter than the reference distance by a movement distance.

In this case, the reference distance may be the EFL of the lens assembly 200. The EFL of the lens assembly 200 may be a distance from a principle point to a focal point. When the lens assembly 200 includes one lens, the EFL may be a distance from a principle point of the one lens to a focal point. When the lens assembly 200 includes a plurality of lenses, the EFL may be a distance from a principle point of one virtual lens serving as the plurality of lenses.

The driving module 300 according to the embodiment of the present invention may change the distance between the light source 100 and the lens assembly 200 by moving the lens assembly 200 by a predetermined movement distance from the reference distance in the optical axis direction. When the lens assembly 200 is moved toward or away from the light source 100 by a first movement distance from the reference distance, the light emitting unit 10 may emit light with the flood light pattern to the object. For example, as illustrated in FIG. 5A, when the lens assembly 200 is moved away from the light source 100 by the first movement distance WDS from the reference distance Dref, the light emitting unit 10 may emit light with the flood light pattern to the object. In this case, a distance from the upper surface of the light source 100 to the principle point of the lens assembly 200 may be a distance in which the reference distance and the first movement distance are added. That is, the distance from the upper surface of the light source 100 to the principle point of the lens assembly 200 may be a distance in which the EFL of the lens assembly 200 and the first movement distance are added. As another example, as illustrated in FIG. 5B, when the lens assembly 200 is moved toward the light source 100 by the first movement distance WDS from the reference distance Dref, the light emitting unit 10 may emit light with the flood light pattern to the object. In this case, the distance from the upper surface of the light source 100 to the principle point of the lens assembly 200 may be a distance in which the reference distance is subtracted by the first movement distance. That is, the distance from the upper surface of the light source 100 to the principle point of the lens assembly 200 may be a distance in which the EFL of the lens assembly 200 is subtracted by the first movement distance.

Referring to FIGS. 5A and 5B, light emitted by each of the emitters is blurry on a focal surface of the lens assembly 200. In the FIGS. 5A and 5B, the light emitted by each of three emitters is illustrated for the sake of convenience in the description but, since the light source 100 includes the plurality of emitters, it may be seen that pieces of light emitted by the emitters overlap each other on the focal surface. As described above, since the pieces of light of the emitters overlap on the focal surface, it may be seen that the light emitting unit 10 emits light with the flood light pattern to the object. However, since uniformity of a predetermined brightness is required in order to use light with the flood light pattern in the ToF camera device or the like, and the uniformity is determined according to a distribution in which the light rays overlap on the focal surface of the lens assembly 200, a distance, in which the lens assembly 200 should be moved (that is, the first movement distance), is very important. When the first movement distance of the lens assembly 200 is too long, an incidence of light becomes gentle at an outer portion of a field of illumination (FOI) of the light emitting unit 10. Accordingly, unnecessary light is emitted to the outer portion of the FOI to cause loss of the light. In addition, when the movement distance of the lens assembly 200 becomes long, an actuator for the lens assembly 200 becomes proportionally large, and thus, there are problems in that it is difficult to miniaturize and power consumption increases. Conversely, when the first movement distance of the lens assembly 200 becomes too short, since uniformity of light on the focal surface of the lens assembly 200 is lowered, there is a problem in that the light emitted to the object has a pattern close to the spot light pattern.

When the movement distance is in a first range, the light emitting unit 10 may emit light with the flood light pattern to the object. That is, when the movement distance of the lens assembly 200 is in the first range, the light emitted to the object may be used as the flood light pattern. The first range may be determined on the basis of a diameter of each of the plurality of emitters, a pitch between the plurality of emitters, and a divergence angle of each of the plurality of emitters.

According to one embodiment, the first range DR may be set according to Expression 1 below.

$$\frac{2.4 \times P_E - D_E}{2 \times \tan\left(\frac{\theta_D}{2}\right)} < DR < \frac{4.2 \times P_E - D_E}{2 \times \tan\left(\frac{\theta_D}{2}\right)} \qquad \text{[Expression 1]}$$

Here, $P_E$ may denote the pitch between the plurality of emitters, $D_E$ may denote the diameter of each of the plurality of emitters, and $\theta_D$ may denote the divergence angle of each of the plurality of emitters.

According to another embodiment, the first range DR may be set according to Expression 2 below.

$$\frac{3 \times P_E - D_E}{2 \times \tan\left(\frac{\theta_D}{2}\right)} < DR < \frac{4.2 \times P_E - D_E}{2 \times \tan\left(\frac{\theta_D}{2}\right)} \qquad \text{[Expression 2]}$$

Here, $P_E$ may denote the pitch between the plurality of emitters, $D_E$ may denote the diameter of each of the plurality of emitters, and $\theta_D$ may denote the divergence angle of each of the plurality of emitters.

The first range according to Expression 2 includes the first range according to Expression 1.

Then, variables of Expression 1 and Expression 2 will be described below in detail with reference to FIGS. 6A to 7.

As illustrated in FIGS. 6A and 6B, the plurality of emitters may be arrayed according to a predetermined rule. The plurality of emitters may be arrayed in a pattern having a square shape as illustrated in FIG. 6A, or the plurality of emitters may be arrayed in a pattern having an equilateral triangle shape as illustrated in FIG. 6B. These are only exemplary, and the plurality of emitters may be arrayed in one of various patterns.

First, the plurality of emitters may be arrayed with a predetermined pitch. In the present invention, the pitch between the plurality of emitters is a pitch between the closest emitters. In the present invention, the pitch between the plurality of emitters is a distance from a center of any one emitter to a center of the closest emitter.

Referring to FIG. 6A, the pitch between the plurality of emitters is a pitch between a first emitter e1 and a second emitter e2, a pitch between the second emitter e2 and a third emitter e3, a pitch between the third emitter e3 and a fourth emitter e4, and a pitch between the fourth emitter e4 and the first emitter e1. Since the first emitter e1, the second emitter e2, the third emitter e3, and the fourth emitter e4 are arrayed according to the pattern having the square shape, a pitch PE between the first emitter e1 and the second emitter e2 may be the same as the pitch between the second emitter e2 and the third emitter e3, the pitch between the third emitter e3 and the fourth emitter e4, and the pitch between the fourth emitter e4 and the first emitter e1. However, the pitch between the plurality of emitters does not include a pitch between the first emitter e1 and the third emitter e3 and a pitch between the second emitter e2 and the fourth emitter e4. This is because the emitter disposed closest to the first emitter e1 is the second emitter e2 and the fourth emitter e4, and the emitter disposed closest to the second emitter e2 is the first emitter e1 and the third emitter e3.

Referring to FIG. 6B, the pitch between the plurality of emitters is a pitch between a first emitter e1 and a second emitter e2, a pitch between the second emitter e2 and a third emitter e3, and a pitch between the third emitter e3 and the first emitter e1. Since the first emitter e1, the second emitter e2, and the third emitter e3 are arrayed in the pattern having the equilateral triangle shape, a pitch PE between the first emitter e1 and the second emitter e2 may be the same as the pitch between the second emitter e2 and the third emitter e3 and the pitch between the third emitter e3 and the first emitter e1.

Next, each of the plurality of emitters may have a predetermined diameter $D_E$. According to one embodiment, as illustrated in FIGS. 6A and 6B, each of the plurality of emitters may have the diameter having a predetermined size, and the diameters of the plurality of emitters may be the same.

Next, each of the plurality of emitters may have a predetermined divergence angle $\theta_D$. As illustrated in FIG. 7, light emitted from one emitter may be output to be spread at a predetermined angle. In this case, an angle, at which light emitted from the emitter is spread, may be the divergence angle. According to one embodiment, the plurality of emitters may have the same divergence angles.

Then, the first range will be described through the embodiment.

According to one embodiment, the pitch between the plurality of emitters may be in the range of 32.5 to 38.5 μm, the diameter of each of the plurality of emitters may be in the range of 7.2 to 8.8 μm, and the divergence angle of each of the plurality of emitters may be in the range of 15 to 25 degrees. According to one embodiment, the pitch between the plurality of emitters may be 35.5 μm, the diameter of each of the plurality of emitters may be 8 μm, and the divergence angle of each of the plurality of emitters may be 20 degrees. In this case, according to Expression 1, the first range may be the range of 279.3 μm to 400.1 μm. That is, when the lens assembly 200 is moved toward or away from the light source 100 by 279.3 μm to 400.1 μm from the reference distance, the light emitting unit 10 may emit light with the flood light pattern to the object. In addition, according to Expression 2, the first range may be the range of 218.9 μm to 400.1 μm. That is, when the lens assembly 200 is moved toward or away from the light source 100 by 218.9 μm to 400.1 μm from the reference distance, the light emitting unit 10 may emit light with the flood light pattern to the object.

According to another embodiment, the pitch between the plurality of emitters may be in the range of 16.3 to 22.3 μm, the diameter of each of the plurality of emitters may be in the range of 3.6 to 4.4 μm, and the divergence angle of each of the plurality of emitters may be in the range of 13 to 23 degrees. According to another embodiment, the pitch between the plurality of emitters may be 19.3 μm, the diameter of each of the plurality of emitters may be 4 μm, and the divergence angle of each of the plurality of emitters may be 18 degrees. In this case, according to Expression 1, the first range may be the range of 169.9 μm to 243 μm. That is, when the lens assembly 200 is moved toward or away from the light source 100 by 169.9 μm to 243 μm from the reference distance, the light emitting unit 10 may emit light with the flood light pattern to the object. In addition, according to Expression 2, the first range may be the range of 133.4 μm to 243 μm. That is, when the lens assembly 200 is moved toward or away from the light source 100 by 133.4 μm to 243 μm from the reference distance, the light emitting unit 10 may emit light with the flood light pattern to the object.

Figure 8:
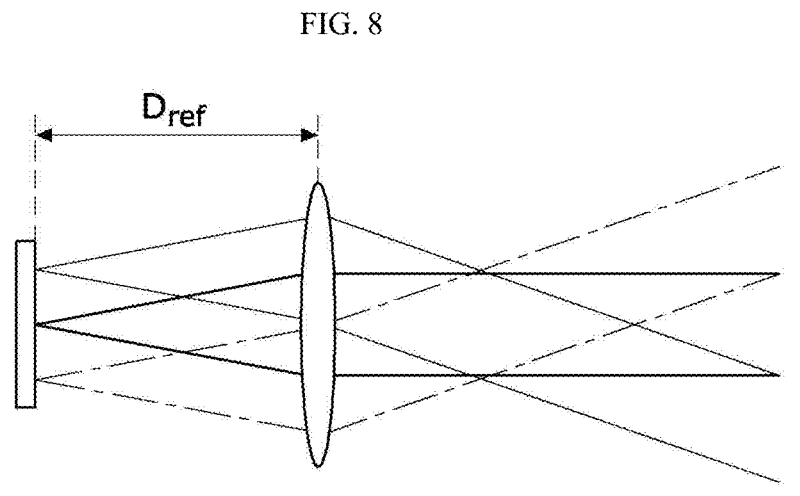

FIG. 8 is a view for describing an operation of the light emitting unit when light with the spot light pattern is output.

According to one embodiment, when the distance between the lens assembly 200 and the light source 100 is the reference distance (that is, the EFL of the lens assembly 200), the light emitting unit 10 may emit light with the spot light pattern to the object. Specifically, as illustrated in FIG. 8, when a distance between the upper surface of the light source 100 and the principle point of the lens assembly 200 is the reference distance, the light emitting unit 10 may emit light with the spot light pattern to the object.

According to another embodiment, when a movement distance of the lens assembly 200 is in a second range, the light emitting unit 10 may emit light with the spot light pattern to the object. In this case, the second range may be 25 μm or less. The second range may be the range of 0 to 25 μm. That is, when the lens assembly 200 is moved by 25 μm or less from the reference distance in the optical axis direction, the light emitting unit 10 may emit light with the spot light pattern to the object.

FIGS. 9A to 9E are images showing simulation results of the camera module according to the embodiment of the present invention.

Figure 9A:
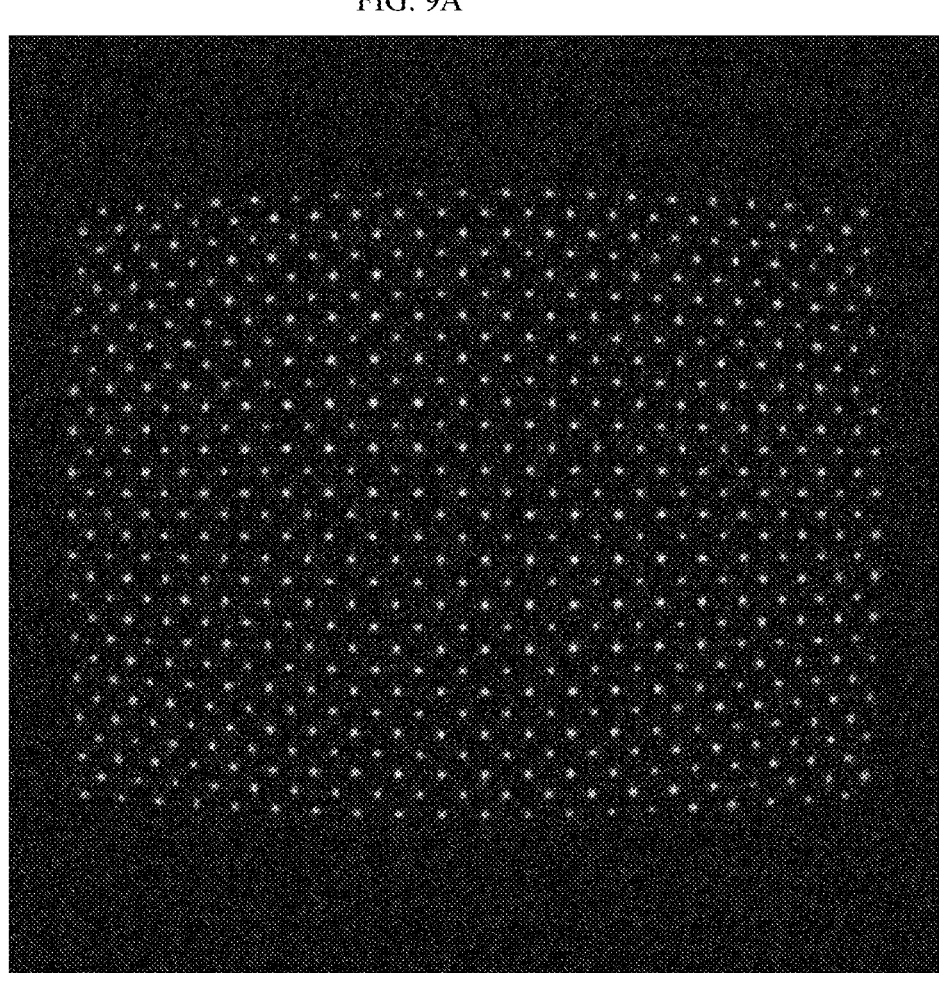
FIGS. 9A to 9E are images showing simulation results of the camera module according to the embodiment of the present invention.

FIG. 9A is an image showing a light pattern of light when the distance between the lens assembly 200 and the light source 100 is the reference distance or when the movement distance of the lens assembly 200 is in the second range. As illustrated in FIG. 9A, in this case, it may be seen that the light emitting unit 10 emits light with the spot light pattern to the object.

Figure 9B:
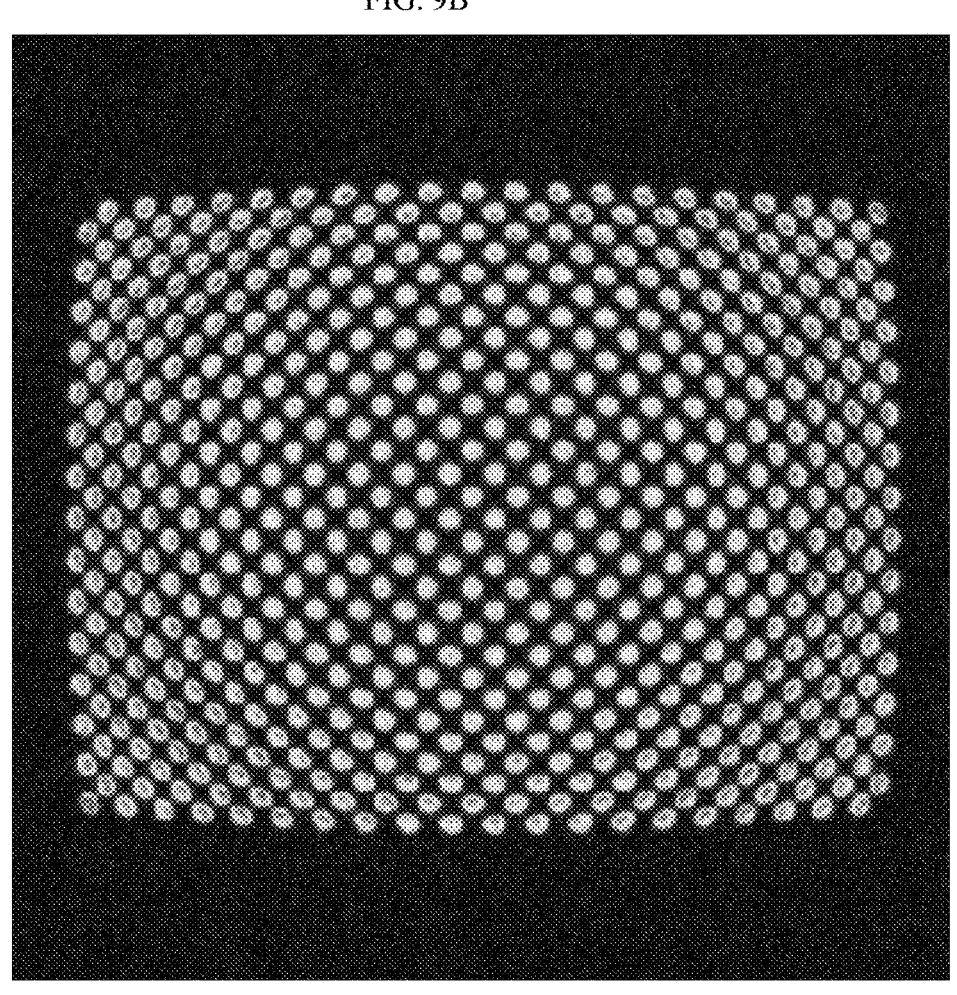

FIG. 9B is an image showing a light pattern of light when the movement distance of the lens assembly 200 is greater than the second range and less than the first range obtained using Expression 2. As illustrated in FIG. 9B, in this case, it may be seen that the light emitting unit 10 emits light with a light pattern, in which an area of a spot is large, to the object. Such a light pattern is an intermediate pattern between the spot light pattern and the flood light pattern and may be difficult to use as even any one of the spot light pattern and the flood light pattern.

Figure 9C:
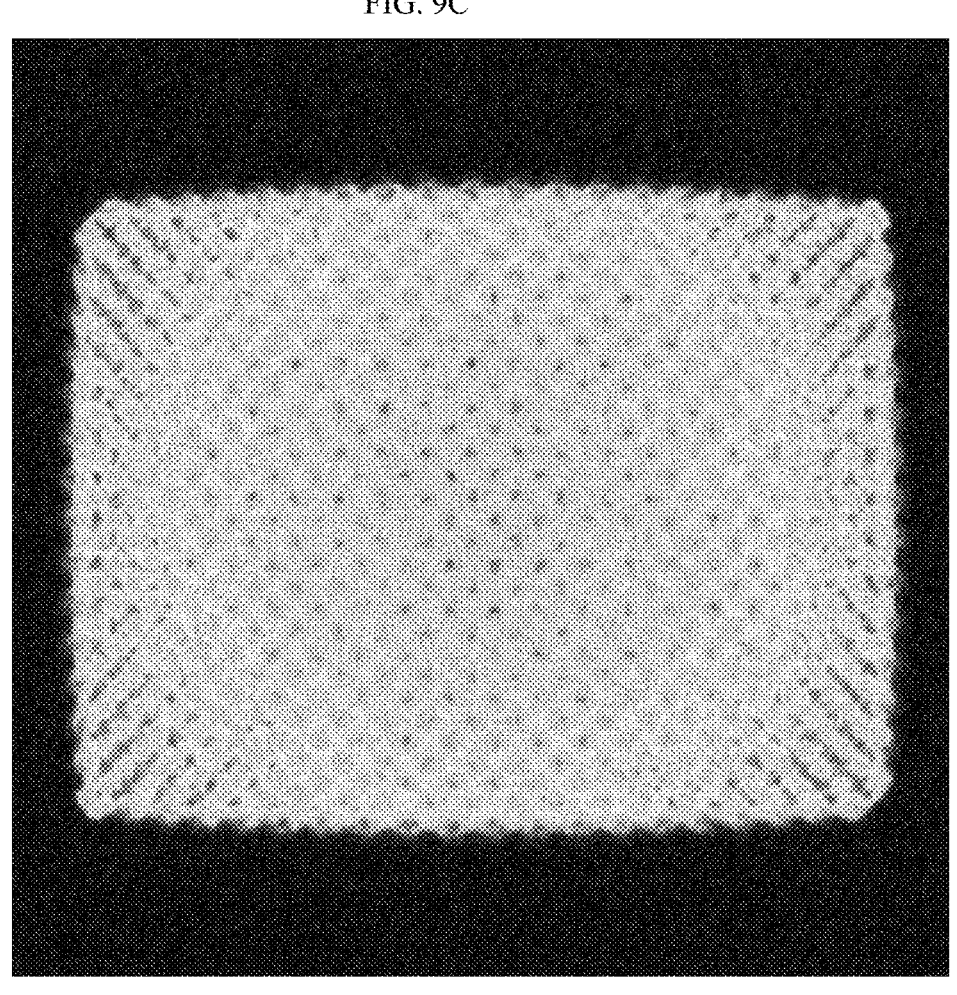

FIG. 9C is an image showing a light pattern of light when the movement distance of the lens assembly 200 corresponds to a minimum value in the first range obtained using Expression 2. As illustrated in FIG. 9C, in this case, it may be seen that the light emitting unit 10 emits light with the flood light pattern to the object. In this case, although some spot patterns are generated in the flood light pattern due to a difference in quantity of light, unlike FIGS. 9A and 9B, since the light continues in a space in the light pattern, the light pattern may be used as the flood light pattern.

Figure 9D:
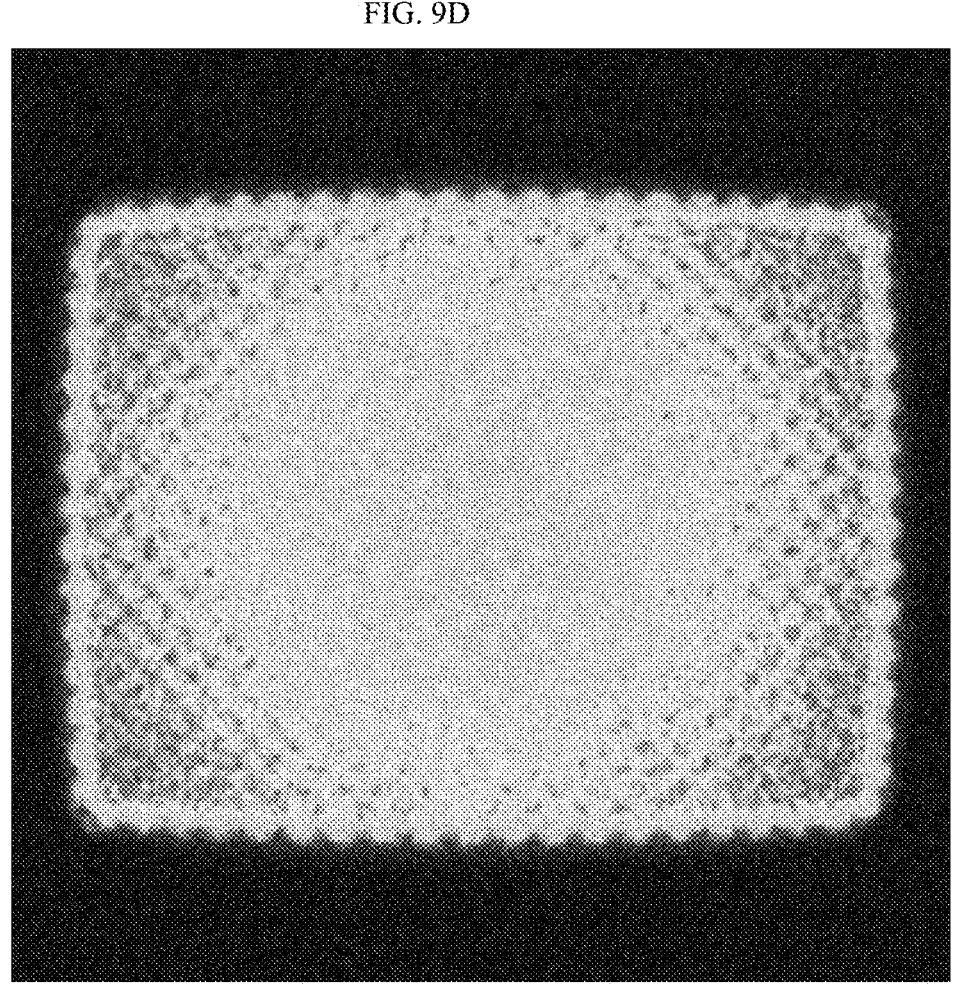

FIG. 9D is an image showing a light pattern of light when the movement distance of the lens assembly 200 is between a minimum value in the first range obtained using Expression 2 and a minimum value in the first range obtained using Expression 1. As illustrated in FIG. 9D, in this case, it may be seen that the light emitting unit 10 emits light with the flood light pattern to the object. In this case, in the flood light pattern, since continuous light is uniformly emitted in a space when compared to a case of FIG. 9C, the camera module may generate a depth image of which quality is higher than that of the light pattern of FIG. 9C.

Figure 9E:
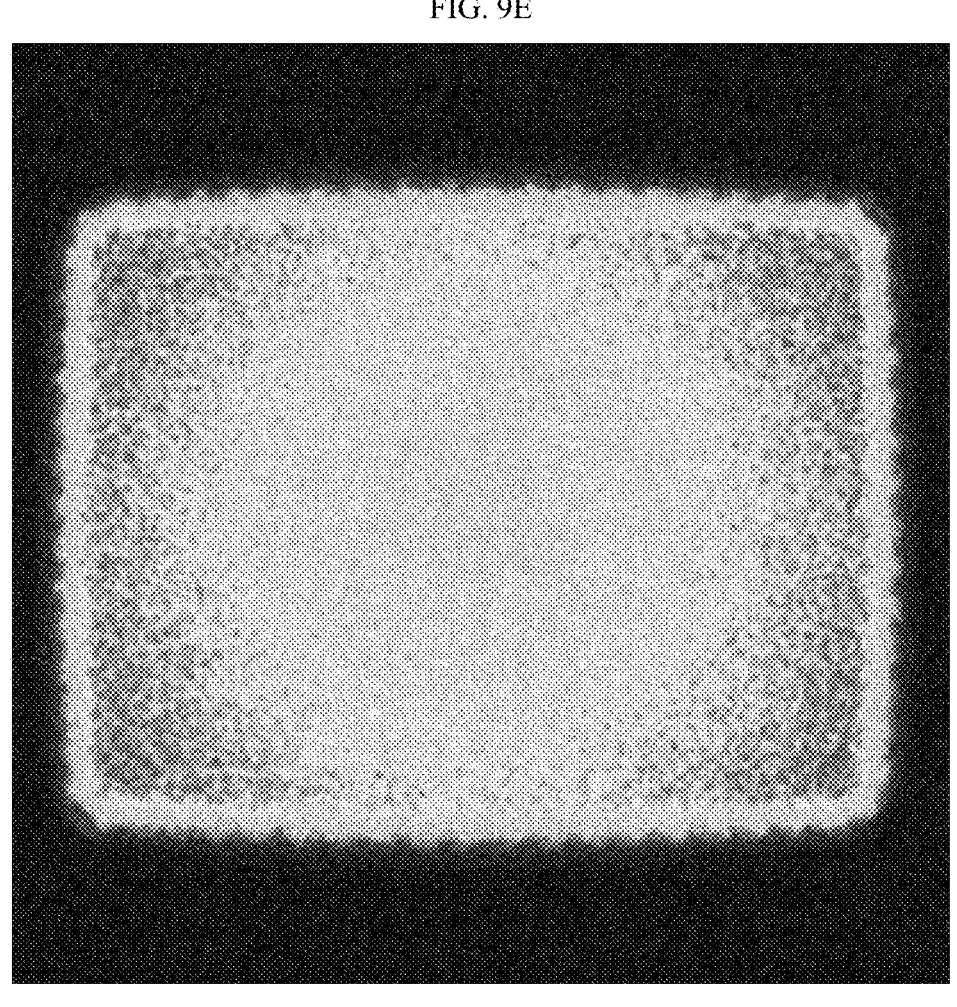

FIG. 9E is an image showing a light pattern of light when the movement distance of the lens assembly 200 corresponds to the first range obtained using Expression 1. As illustrated in FIG. 9E, in this case, it may be seen that the light emitting unit 10 emits light with the flood light pattern to the object. In this case, in the flood light pattern, since continuous light is uniformly emitted in a space to a degree in which a shape of a dot pattern is not shown, the camera module may generate a depth image of which quality is higher than that of each of the light patterns of FIGS. 9C and 9D.

While the present invention has been mainly described above with reference to the embodiments, it will be understood by those skilled in the art that the present invention is not limited to the embodiments, but the embodiments are only exemplary, and various modifications and applications which are not illustrated above may fall in the range of the present invention without departing from the essential features of the present embodiments. For example, components specifically described in the embodiments may be modified and implemented. In addition, it should be understood that differences related to modifications and applications fall in the scope of the present invention defined by the appended claims.

What is claimed is:

1. A camera module comprising:
a light emitting unit configured to emit light with a spot light pattern or flood light pattern to an object; and

a light receiving unit configured to receive light reflected by the object, wherein the light emitting unit includes a light source including a plurality of emitters each disposed at a predetermined pitch, a lens assembly disposed to be spaced apart from an upper end of the light source, and a driving module that changes a distance between the light source and the lens assembly by moving the lens assembly by a predetermined movement distance from a reference distance in an optical axis direction, wherein the reference distance is an effective focal length of the lens assembly, wherein, when the movement distance is in a first range, the light emitting unit is configured to emit light with the flood light pattern to the object, wherein the first range is set on the basis of a diameter of each of the plurality of emitters, a pitch between the plurality of emitters, and a divergence angle of each of the plurality of emitters, and wherein the first range (DR) is set according to Expression below:

$$\frac{2.4 \times P_E - D_E}{2 \times \tan\left(\frac{\theta_D}{2}\right)} < DR < \frac{4.2 \times P_E - D_E}{2 \times \tan\left(\frac{\theta_D}{2}\right)},$$

wherein $P_E$ denotes the pitch between the plurality of emitters, $D_E$ denotes the diameter of each of the plurality of emitters, and Op denotes the divergence angle of each of the plurality of emitters.

2. The camera module claim 1, wherein, when the movement distance is in a second range, the light emitting unit is configured to emit light with the spot light pattern to the object.

3. The camera module of claim 2, wherein the second range is 0 to 25 μm.

4. The camera module of claim 1, wherein:
the pitch between the plurality of emitters is in a range of 32.5 to 38.5 μm;
the diameter of each of the plurality of emitters is in a range of 7.2 to 8.8 μm; and
the divergence angle of each of the plurality of emitters is in a range of 15 to 25 degrees.

5. The camera module of claim 1, wherein:
the pitch between the plurality of emitters is in a range of 16.3 to 22.3 μm;
the diameter of each of the plurality of emitters is in a range of 3.6 to 4.4 μm; and
the divergence angle of each of the plurality of emitters is in a range of 13 to 23 degrees.

6. The camera module of claim 1, wherein the driving module comprises an actuator physically coupled to a housing of the lens assembly, and

wherein the actuator is a voice coil motor (VCM), a micro-electro mechanical systems (MEMS) actuator, a shape memory alloy (SMA) actuator, or an actuator based on piezo electricity.

7. A camera module comprising:
a light emitting unit configured to emit light with a spot light pattern or flood light pattern to an object; and
a light receiving unit configured to receive light reflected by the object, wherein the light emitting unit includes a light source including a plurality of emitters each disposed at a predetermined pitch, a lens assembly disposed to be spaced apart from an upper end of the light source, and a driving module that changes a distance between the light source and the lens assembly by moving the lens assembly by a predetermined movement distance from a reference distance in an optical axis direction, wherein the reference distance is an effective focal length of the lens assembly, wherein, when the movement distance is in a first range, the light emitting unit is configured to emit light with the flood light pattern to the object, wherein the first range is set on the basis of a diameter of each of the plurality of emitters, a pitch between the plurality of emitters, and a divergence angle of each of the plurality of emitters, and wherein the first range (DR) is set according to Expression below:

$$\frac{3 \times P_E - D_E}{2 \times \tan\left(\frac{\theta_D}{2}\right)} < DR < \frac{4.2 \times P_E - D_E}{2 \times \tan\left(\frac{\theta_D}{2}\right)},$$

wherein $P_E$ denotes the pitch between the plurality of emitters, $D_E$ denotes the diameter of each of the plurality of emitters, and Op denotes the divergence angle of each of the plurality of emitters.

8. The camera module of claim 7, wherein, when the movement distance is in a second range, the light emitting unit is configured to emit light with the spot light pattern to the object.

9. The camera module of claim 8, wherein the second range is 0 to 25 μm.

10. The camera module of claim 7, wherein the driving module comprises an actuator physically coupled to a housing of the lens assembly, and wherein the actuator is a voice coil motor (VCM), a micro-electro mechanical systems (MEMS) actuator, a shape memory alloy (SMA) actuator, or an actuator based on piezo electricity.

* * * * *